(12) United States Patent
Potkins et al.

(10) Patent No.: US 11,665,423 B2
(45) Date of Patent: May 30, 2023

(54) WIRELESS CCTV MODULE AND POWER MANAGEMENT SYSTEM

(71) Applicant: Wireless CCTV Limited, Rochdale (GB)

(72) Inventors: Simon James Potkins, Lancs (GB); Ian Ramsdale, Lancs (GB); Timothy James Williams, Lancs (GB)

(73) Assignee: Wireless CCTV Limited, Rochdale (GB)

( * ) Notice: Subject to any disclaimer, the term of this patent is extended or adjusted under 35 U.S.C. 154(b) by 0 days.

(21) Appl. No.: 17/370,271

(22) Filed: Jul. 8, 2021

(65) Prior Publication Data

US 2022/0014668 A1    Jan. 13, 2022

(30) Foreign Application Priority Data

Jul. 13, 2020 (GB) ...................... 2010744

(51) Int. Cl.
*H04N 23/661* (2023.01)
*G03B 7/26* (2021.01)
(Continued)

(52) U.S. Cl.
CPC ............ *H04N 23/661* (2023.01); *G03B 7/26* (2013.01); *G08B 21/12* (2013.01); *H04N 23/50* (2023.01);
(Continued)

(58) Field of Classification Search
CPC ............... H04N 5/232; H04N 5/23203; H04N 5/23206; H04N 5/232061; H04N 5/2251;
(Continued)

(56) References Cited

U.S. PATENT DOCUMENTS

| | | | | |
|---|---|---|---|---|
| 9,077,183 | B2* | 7/2015 | Thomas | H04W 52/0219 |
| 9,756,570 | B1* | 9/2017 | Ramachandra | G06F 1/3212 |
| 2008/0288986 | A1* | 11/2008 | Foster | H04N 21/4367 |
| | | | | 348/E7.086 |
| 2010/0283857 | A1* | 11/2010 | Gopinath | H04N 7/181 |
| | | | | 348/152 |

(Continued)

FOREIGN PATENT DOCUMENTS

| | | | | |
|---|---|---|---|---|
| CN | 111200864 | A * | 5/2020 | G01D 21/02 |
| CN | 111200864 | A | 5/2020 | |

(Continued)

OTHER PUBLICATIONS

European Search Report and Written Opinion dated Nov. 22, 2021, in connection with EP21179641.
Search Report dated Dec. 14, 2020, in connection with related GB2010744.7 filed on Jul. 13, 2020.

*Primary Examiner* — Twyler L Haskins
*Assistant Examiner* — Akshay Trehan
(74) *Attorney, Agent, or Firm* — Downs Rachlin Martin PLLC (57) ABSTRACT

A remote CCTV module for a wireless monitoring system includes a communications interface configured to transmit data to a server over a wireless telecommunications network; a sensor interface configured to receive sensor data from a sensor; a CCTV camera; and a controller. The controller controls the communications interface to transmit the sensor data over the wireless telecommunications network at a first frequency; processes the sensor data to detect an event in an environment proximate to the module, and in response to detecting the event, controls the communications interface to transmit the sensor data over the wireless telecommunications network at a second frequency, wherein the second frequency is higher than the first frequency.

18 Claims, 5 Drawing Sheets

(51) Int. Cl.
*G08B 21/12* (2006.01)
*H04N 23/50* (2023.01)
*H04N 23/57* (2023.01)
*G08B 13/196* (2006.01)

(52) U.S. Cl.
CPC ....... *H04N 23/57* (2023.01); *G03B 2217/007* (2013.01); *G08B 13/19613* (2013.01)

(58) Field of Classification Search
CPC ............... H04N 5/2252; H04N 5/2253; H04N 5/2257; H04N 5/2258; H04N 23/50; H04N 23/51; H04N 23/54; H04N 23/55; H04N 23/57; H04N 23/60; H04N 23/66; H04N 23/661; H04N 23/662; G03B 7/26; G03B 2217/007; G08B 21/12; G08B 13/196; G08B 13/19613; G08B 13/19654–19669

See application file for complete search history.

(56) References Cited

U.S. PATENT DOCUMENTS

| 2011/0134243 | A1* | 6/2011 | Siann | H04N 7/185 348/143 |
| 2014/0045556 | A1 | 2/2014 | Subramanian et al. | |
| 2015/0195442 | A1* | 7/2015 | Pacurariu | H04N 5/23203 348/211.2 |
| 2015/0327168 | A1* | 11/2015 | Yllasjarvi | G06F 1/3206 370/311 |
| 2015/0327450 | A1 | 11/2015 | Rochette et al. | |
| 2017/0280412 | A1* | 9/2017 | Chen | H04W 64/006 |
| 2020/0119459 | A1* | 4/2020 | Fried | H01Q 19/106 |
| 2020/0205081 | A1* | 6/2020 | Garg | H04W 52/0277 |

FOREIGN PATENT DOCUMENTS

| EP | 2942697 A1 | 11/2015 |
| WO | 2008119043 A1 | 10/2008 |

* cited by examiner

WIRELESS CCTV MODULE AND POWER MANAGEMENT SYSTEM

FIELD

This disclosure relates to a remote module, such as a CCTV module, and a system comprising the same. This disclosure also relates to a method of monitoring an event using the remote module.

BACKGROUND

Monitoring systems may comprise a plurality of remote modules such as CCTV modules or other remote sensor modules such as pollution monitors, water-level monitors and the like. Such remote modules typically rely on fixed infrastructure, including a power supply from a mains electricity source, and a wired network connection to transmit data collected by the remote module to a server.

However, in some circumstances, monitoring systems must be installed in remote, hostile or unpopulated environments where such fixed infrastructure is unavailable. For example, modules may be installed to monitor a body of water such as a reservoir, which is located in a remote rural setting, and thus may be distant from wired telecommunications network infrastructure and power infrastructure. Similarly, modules installed to monitor an oil refinery in a desert may be remote from such infrastructure.

In other circumstances, systems may be installed where connecting to fixed infrastructure is cost prohibitive or undesirable. For example, in a busy city centre location, it may be undesirable to undertake disruptive ground works to connect modules to mains electricity or wired network infrastructure.

It is therefore desirable to provide remote modules which rely on batteries chargeable by other power sources, such as solar or wind power, and which transmit and receive data over wireless telecommunication networks.

It is an aim of this disclosure to provide a remote module suitable for installation without access to mains electricity or wired network infrastructure. It is a further aim of this disclosure to provide a remote module which efficiently manages battery power.

SUMMARY

According to the present invention there is provided an apparatus and method as set forth in the appended claims. Other features of the invention will be apparent from the dependent claims, and the description which follows.

According to a first aspect of the disclosure there is provided a remote CCTV module for a wireless monitoring system. The system includes a communications interface configured to transmit data to a server over a wireless telecommunications network; a sensor interface configured to receive sensor data from a sensor; a CCTV camera; and a controller configured to: control the communications interface to transmit the sensor data over the wireless telecommunications network at a first frequency; process the sensor data to detect an event in an environment proximate to the module, and in response to detecting the event, control the communications interface to transmit the sensor data over the wireless telecommunications network at a second frequency, wherein the second frequency is higher than the first frequency.

The sensor may comprise one of a pollution sensor, a water-level sensor, microphone, wind sensor, noise sensor, radioactivity sensor, water flow sensor, pressure sensor, ultraviolet (UV) light sensor, pollen sensor, temperature sensor, humidity sensor, or magnetic field sensor. The controller may be configured to detect the event based on a value of the sensor data exceeding a first predetermined threshold, or being below a second predetermined threshold. The predetermined thresholds may be remotely configurable.

The sensor may comprise the CCTV camera. The sensor data may comprise image data. The controller may be configured to detect an event in video images captured by the camera, preferably the image data.

The communication interface may be configured to transmit and/or receive data over a 5G network. The communication interface may be configured to transmit and/or receive data over one or more of 4G, 3G, 2G, EDGE, High Speed Packet Access (HSPA), High Speed Downlink Packet Access (HSDPA), or General Packet Radio Service (GPRS). The communication interface may be configured to send and/or receive SMS messages.

The communication interface may be configured to transmit and/or receive data from other remote modules.

The controller may be configured to detect cessation of the event, and in response revert to transmitting data at the first frequency.

The remote module may be configured to receive a notification from the server, indicating an event detected by another remote module, and in response transmit the sensor data over the wireless telecommunications network at an increased frequency.

The remote module may comprise a battery. The remote module may comprise a power generator to recharge the battery. The power generator may comprise one of a solar panel, wind turbine, or water wheel. The remote module may be configured to operate without mains power.

The controller may be configured to determine that a remaining power of the battery is less than a predetermined value, and in response change a communication mode used by the communications interface to transmit data. The controller may be configured to change the communication mode from a first communication mode to a second communication mode, wherein the second communication mode consumes less power than the first communication mode. The second communication mode may comprise transmitting data to another remote module to be relayed to the server.

The controller may be configured to determine that a remaining power of the battery is less than a predetermined value, and in response reduce the transmission frequency.

The controller may be configured to determine that a remaining power of the battery is less than a predetermined value, and hand off monitoring of the event to a second remote module.

The remote module may comprise the sensor.

According to a second aspect of the disclosure there is provided a wireless monitoring system, comprising: a server, and a plurality of remote CCTV modules as defined in the first aspect.

Further suitable features of the second aspect are defined in relation to the first aspect hereinabove, and may be combined in any combination.

According to a third aspect of the disclosure there is provided a method of monitoring an event. The method includes capturing, by a remote CCTV module, sensor data from a sensor; transmitting, by the remote CCTV module, the sensor data over a telecommunications network at a first frequency; detecting, by the remote CCTV module, an event in an environment proximate to the module by processing the sensor data; and in response to detecting the event, transmitting the sensor data over the network at a second frequency, the second frequency higher than the first frequency.

The method may comprise further steps as defined herein.

The disclosure also extends to a tangible non-transient computer-readable storage medium having recorded thereon instructions which, when executed by a computer, cause the computer to perform any of the methods set forth herein.

The disclosure also extends to a computer program product comprising instructions which, when the program is executed by a computer, cause the computer to carry out any of the methods set forth herein.

BRIEF DESCRIPTION OF DRAWINGS

For a better understanding of the invention, and to show how embodiments of the same may be carried into effect, reference will now be made, by way of example only, to the accompanying diagrammatic drawings in which.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of the various examples. Also, common but well-understood elements that are useful or necessary in a commercially feasible embodiment are often not depicted in order to facilitate a less obstructed view of these various examples.

DETAILED DESCRIPTION

In overview, examples of the disclosure provide a remote module that is able to detect an event occurring in its proximity, and alter the frequency with which it transmits data over a wireless communication network accordingly. This assists in appropriate usage of battery power, by altering the frequency, and thus consuming more power, in response to circumstances where more frequent transmissions are required. In some examples, the remote module is a CCTV module, comprising a camera, but the remote module may alternatively or additionally comprise other sensors.

Figure 1:
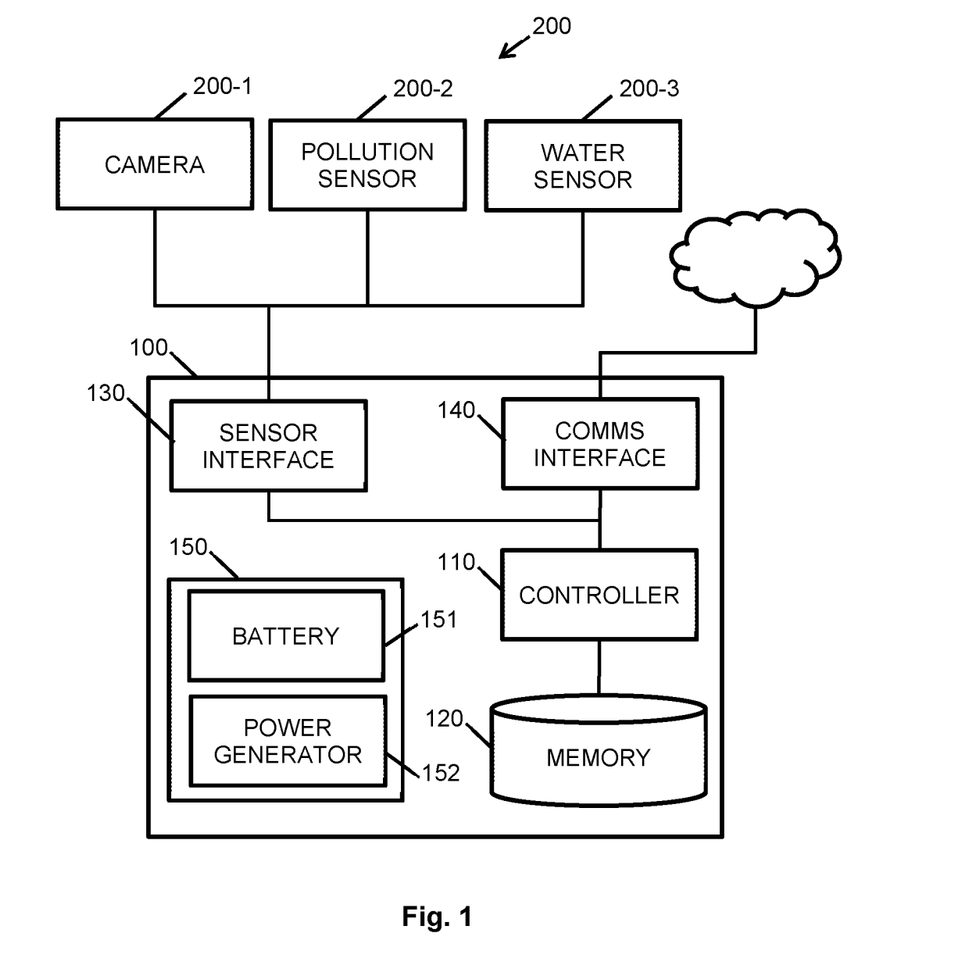
FIG. 1 is a schematic block diagram of an example remote module.

FIG. 1 shows a remote module 100. The module 100 comprises a controller 110, a memory 120, a sensor interface 130, communications interface 140 and a power supply section 150.

The controller 110 may take the form of a Central Processing Unit (CPU), Graphics Processing Unit (GPU), Field Programmable Gate Array (FPGA), Application Specific Integrated Circuit (ASIC) or any other suitable compute unit. In some examples, the controller 110 may comprise multiple compute units, for example multiple CPUs, GPUs and the like.

The memory 120 is a storage configured to store, permanently or transiently, any data required for the operation of the module 100. The memory 120 may comprise volatile memory, such as Random Access Memory (RAM). The memory 120 may comprise non-volatile memory, such as flash memory, solid state drives, hard disk drives and the like. The memory 120 may store instructions, which when executed by controller 110 cause the module 100 to carry out the methods described herein.

The sensor interface 130 is configured to obtain data from a sensor 200. In one example, the sensor 200 comprises a camera, such as a video camera 200-1. The video camera 200-1 may be a CCTV camera, in which case the remote module 100 may be a CCTV module 100. In another example, the sensor 200 comprises a pollution sensor 200-2. In another example, the sensor 200 comprises a water-level sensor 200-3.

The sensor interface 130 may take the form of any suitable interface for communicating with a sensor 200. For example, the sensor interface 130 may comprise a wired interface. In other examples, the sensor interface 130 may be wireless. A variety of communication modes may be employed, including LAN, ethernet, Wi-Fi, Bluetooth, Bluetooth Low Energy, Zigbee, Wi-Fi, Wi-Fi direct, radio communications, or a serial interface.

In some examples, the sensor interface 130 is configured for connection to a plurality of sensors 200, including sensors 200 of different types and/or via different communication methods. In other examples, the remote module 100 may comprise a plurality of sensor interfaces 130 so as to communicate with a plurality of sensors 200.

The sensors 200 may provide the remote module 100 with data. For example, the camera 200-1 may provide image data, such as frames of captured video. The pollution sensor 200-2 may provide pollution data, such as a level of a predetermined substance in the air. The water-level sensor 200-3 may provide a measurement of the water level.

The sensors 200 may provide digital data to the remote module 100. In other examples, the sensors 200 may provide analogue data (e.g. a varying voltage) to remote module 100.

In some examples, the sensors 200 transmit the data to the module 200. In other examples the module 100 may read data from the sensors 200, for example by accessing a memory of the sensor 200 via the interface 130. The module 100 may also be configured to change the state of the sensor 200. In some examples, the sensors 200 may comprise a power supply separate to that of the module 100, and may transmit their battery level to the module 100.

In some examples, a sensor 200 may be connected, or connectable, to a plurality of modules 100. The sensor 200 may be accessed concurrently by two modules 100, or alternatively the sensor 200 may be accessed by a first module 100 and then subsequently a second module 100 may connect to the sensor 200.

The communications interface 140 is configured to transmit data over a telecommunications network to a server 300. The communications interface 140 may also be configured to receive data from the server 300. The server 300 will be discussed in further detail hereinbelow.

In one example, the communication interface 140 is configured to transmit and/or receive data over a 5G network. Accordingly, the communication interface 140 may comprise a 5G modem. In other examples, the communication interface 140 is configured to communicate over one or more of 4G, 3G, 2G, EDGE, High Speed Packet Access (HSPA), High Speed Downlink Packet Access (HSDPA), or General Packet Radio Service (GPRS). In one example, the communication interface 140 is configured to send and/or receive SMS messages.

In still further examples, the communication interface 140 may be configured to transmit and/or receive data from other remote modules 100. The communication interface 140 may comprise suitable hardware for short-distance or line-of-sight communication with other modules, including Bluetooth, Wi-Fi direct, or radio communication.

The communication interface 140 is configured to transmit data at regular intervals. The communication interface 140 is configured to alter the frequency of the transmissions, also referred to herein as the periodicity of the transmissions. In other words, the length of the interval between consecutive transmissions may be adjusted. This may, for example, be in response to the detection of an event by the module 100, as discussed hereinbelow.

In one example, the communication interface 140 is configured to transmit data over a plurality of networks. For example, the communication interface 140 may selectively transmit data over a particular network dependent upon the power supply status of the module 100 as discussed below.

The power supply section 150 may comprise a suitable power supply for the remote module 100. For example, the power supply section 150 may comprise a battery 151. The power supply section 150 may also comprise a power generator 152, which may take the form of a solar panels, wind turbines, water wheels or any other suitable means of charging the battery 151 without relying on a mains power supply.

The remote module 100 may comprise a housing or casing (not shown), configured to enclose components of the module 100. It will be appreciated that some components of the module 100 (e.g. the power generator 152 and/or the sensors 200) may not be retained within the housing and may be disposed on the exterior of the housing or remote therefrom. However, in other examples some sensors 200 may be formed integrally with the housing or disposed therein.

In one example, the remote module 100 comprises a computer, for example a mini PC. The computer may comprise a Linux based operating system. The computer may be remotely configurable. In other words, the computer may be remotely controlled and configured, via the communication interface 140. This may for example allow the remote module to be updated or upgraded without physically accessing the remote module 100.

The controller 110 is configured to detect an event, based on data received via the sensor 200.

For example, the controller 110 may recognise an event based on the received data exceeding a predetermined threshold or being below a predetermined threshold. For example, the water-level sensor 200-3 may detect a water-level that exceeds a threshold, or that has dropped below a threshold. Similarly, an event may be detected by a pollution sensor 200-2 providing a measurement over a predetermined threshold.

In the examples where the sensor is a video camera 200-1, an event may be detected by analysis of the images of the video. For example, a machine-learning based event detection algorithm may be employed to detect a predetermined event in the video imagery. This may for example include detection of persons, objects, or persons behaving in a particular manner.

In other examples, the sensor 200 itself may report the occurrence of the event, and the controller 110 may recognise the occurrence of the event accordingly. Accordingly, in such examples the sensor may comprise a compute element and suitable memory storing instructions for detecting the event. For example, the camera 200-1 may include event detection software, or the sensors 200-2 or 200-3 may comprise instructions to compare sensor readings with appropriate thresholds.

In one example, thresholds or parameters for event detection may be remotely configurable. Accordingly, a remote device (e.g. the server 300) may access the remote module 100 and edit the thresholds.

Figure 2:
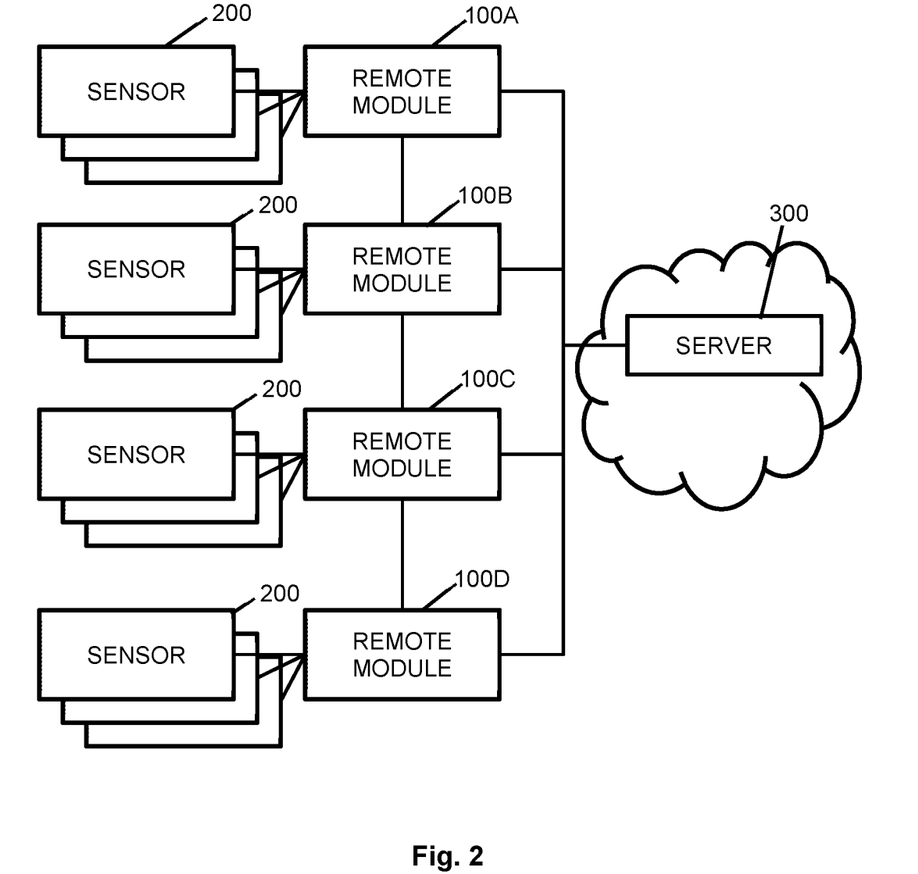
FIG. 2 is a schematic block diagram of an example system comprising the remote module of FIG. 1.

FIG. 2 shows an example system 1 comprising a plurality of remote modules 100A-D and a server 300. As shown in FIG. 2, the remote modules 100A-D are each in communication with the server 300 via a telecommunications network. Furthermore, at least some of the remote modules 100A-D are able to communicate with each other—i.e. without communicating via the server 300.

The server 300 may take the form of any suitable server computer accessible via the telecommunications network. For example, the server 300 may be hosted in a public or private cloud.

The server 300 comprises suitable compute elements and memory storing any instructions required to carry out the methods discussed herein. In one example, the stored instructions comprise applications for the remote monitoring of sensor data, and/or for the configuration of the modules 100.

In use, a plurality of remote modules 100 are equipped with appropriate sensors 200 and power generators 152 and installed to monitor a structure, environment or the like.

For example, remote modules 100 may be installed at various locations around a reservoir. The remote modules 100 may be equipped with water-level sensors 200-3 to monitor the water-level, and optionally CCTV cameras 200-1, so as to provide visual feedback as to the state of the reservoir. Such reservoirs are often located in remote rural environments, where telecommunications signals can be intermittent and mains power is not available.

In another example, remote modules 100 comprising CCTV cameras 200-1 may be disposed in an urban environment (e.g. a city centre), or a temporary event space (e.g. a festival or sporting event), to monitor the environment.

In yet another example, remote modules 100 comprising pollution sensors 200-3 are disposed proximate to roads in a road network, to monitor pollution. The modules may also be equipped with CCTV cameras, to provide visual feedback in relation to traffic conditions.

An example of the operation of the system 1 will now be discussed with respect to FIG. 3.

In block S31, a remote module 100 receives data from its sensors 200, as discussed herein.

In block S32, the remote module 100 transmits the received data to the server 300 at a first frequency. For example, the remote module 100 may transmit an image captured by a camera 200-1, or a sensor reading from sensors 200-2, 200-3, once per hour, or once every two hours.

In some examples, the remote module 100 transmits received data from all of its connected sensors 200. For example, the module 100 may transmit CCTV images and readings from sensors 200. Alternatively, received data from only one sensor 200 or only a subset of the sensors 200 may be transmitted. Furthermore, the module 100 may transmit received data from multiple sensors 200 (e.g. all connected sensors 200) in a single transmission, or may include data from different sensors 200 in different transmissions.

In block S33, the remote module 100 detects an event based on the data received from the sensors 200. For example, the remote module 100 may detect that the event is a potential flood risk in a monitored reservoir, based on a water-level sensor exceeding a predetermined threshold.

Upon detecting the event, in block S34 the remote module 100 begins to transmit the received data to the server 300 at a second frequency, wherein the second frequency is higher than the first frequency. For example, the module 100 may begin to transmit CCTV imagery or sensor readings once every 10 minutes, 5 minutes or 1 minute.

The remote module 100 may also notify the server 300 of the event, for example by setting a flag in the transmitted messages or sending a separate message indicating the start of the event.

Accordingly, in normal usage, the remote module 100 transmits data at a lower frequency, thereby reducing power consumption. This is especially important where the module relies on batteries recharged by solar power or the like. However, in response to the detection of a relevant event, the module 100 transmits more frequently, to provide necessary monitoring data related to the event. Upon cessation of the event, the remote module 100 may revert to transmitting data at the first frequency.

In some examples, the frequency may increase further from the second frequency to a third frequency greater than the second frequency. This may be in response to the remote module 100 detecting a change in the event, or a worsening of the conditions of the event. For example, if the data from the sensor 200 exceeds a further threshold (e.g. the water level increases further in the case of water level sensor 200-3) or drops below a further threshold, the frequency of transmission may be increased. In the case of image processing, the detection of additional events/objects in the imagery (e.g. a greater number of people participating in an activity) may similarly result in an increase to the frequency. It will be appreciated that the transmission frequency may be increased and decreased in response to the sensor data, such that there may be any number of thresholds defined.

Figure 4:
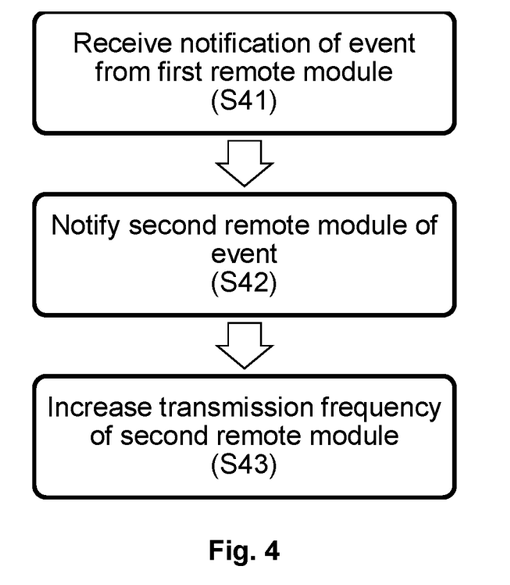

FIG. 4 illustrates another example of the operation of the system 1.

Figure 3:
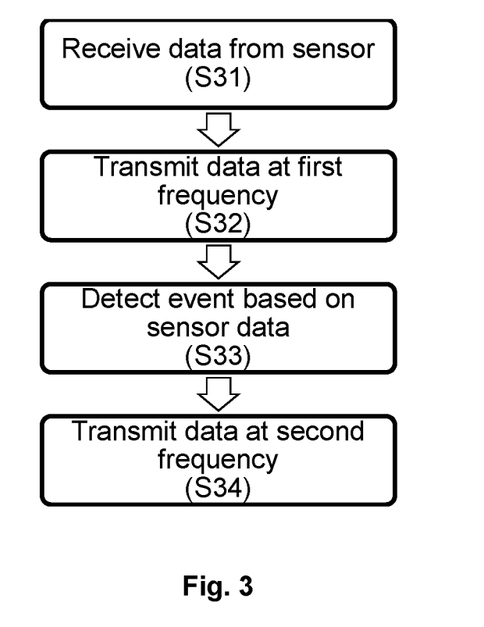
FIG. 3-7 are schematic flowcharts of example methods.

In block S41, the server 300 receives notification of an event from a first remote module 100, for example as outlined above with respect to FIG. 3.

In block S42, the server 300 notifies a second remote module 100 of the event. This may for example be a second remote module 100 that is located geographically proximate to the first remote module 100.

In block S43, the second remote module 100 increases its transmission frequency, for example from the first frequency to the second frequency discussed above. Accordingly, the detection of an event by one remote module 100 may result in other proximate modules 100 beginning to transmit data at an increased rate.

Figure 5:
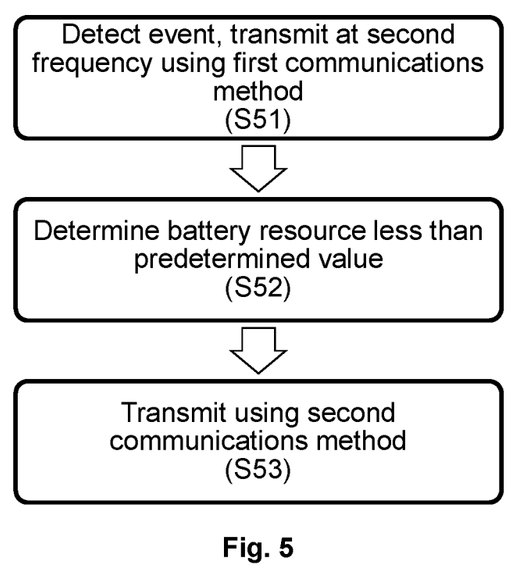

FIG. 5 illustrates a further example of the operation of the system 1.

In block S51, a remote module 100 detects an event and begins transmitting data at the second frequency as discussed above in relation to FIG. 3. The transmission occurs using a first communications mode, for example over 5G.

In block S52, the module 100 determines that its remaining battery resource is less than a predetermined value.

In response, in block S53, the module 100 ceases transmitting using the first communication mode, and instead begins to transmit using a second communications mode. The second communications mode may consume less power than the first communications mode. For example, the module 100 may switch from 5G to 4G.

In some examples, the module 100 may continue to successively switch to lower-energy communications modes as the battery 151 depletes. For example, the module 100 may switch from 5G, to 4G, to 3G, before sending data by SMS.

The communication modes used in local transmission between modules 100, such as short-distance or line-of-sight communication with other modules, including Bluetooth, Wi-Fi direct, or radio communication, may consume less power than some methods of direct communication with the server 300. Accordingly, in one example, the module 100 may switch to a communication mode comprising the transmission of data to another remote module 100, whereupon it is relayed to the server 300, in response to the battery level reducing beyond a predetermined threshold.

Accordingly, these steps may assist in prolonging the battery life of the module during an ongoing event.

Figure 6:
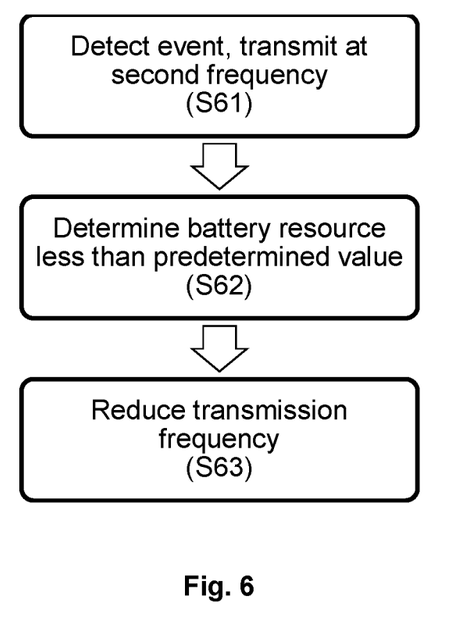

FIG. 6 illustrates another example of the operation of the system 1.

In block S61, a remote module 100 detects an event and begins transmitting data at the second frequency as discussed above in relation to FIG. 3.

In block S62, the remote module 100 detects that the remaining battery resource is less than a predetermined value.

In block S63, the remote module 100 reduces the transmission frequency. For example, the remote module 100 may reduce the transmission frequency to the first frequency. In other examples, the frequency may be reduced to third frequency between the first frequency and second frequency, or a fourth frequency less than the first frequency.

These steps may likewise assist in prolonging the battery life of the module during an ongoing event.

When the remaining battery resource increases due to the power generator 152 recharging the battery 151, the module 100 may return to using communications modes with higher power consumption and/or increase the transmission frequency. For example, when the remaining battery resource increases beyond a predetermined threshold, transmission may be switched to a higher power consumption mode, and back to the second frequency.

Figure 7:
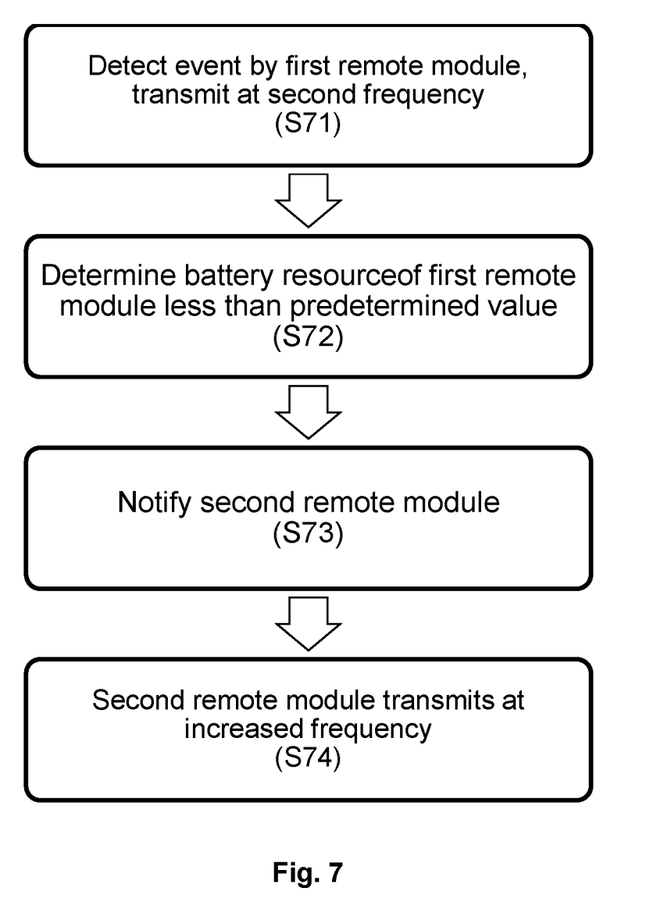

FIG. 7 shows another example of the operation of the system 1.

In block S71, a first remote module 100 detects an event and begins transmitting data at the second frequency as discussed above in relation to FIG. 3.

In block S72, the first remote module 100 detects that the remaining battery resource is less than a predetermined value.

In block S73, the first remote module 100 transmits notifies a second remote module 100 of the event.

In block S74, the second remote module 100 begins transmitting data to the server 300 at an increased frequency. For example, the second remote module 100 may switch from transmitting data at the first frequency to the second frequency discussed hereinabove.

As discussed hereinabove, some example sensors 200 may be accessible by more than one remote module 100. In such an example, the second remote module 100 may access a sensor 200 of the first module 100 and begin reporting data therefrom.

In block S75, the first remote module 100 may return to transmitting data at the first frequency. Accordingly, upon the battery resource decreasing below a predetermined threshold, a module 100 may hand off event monitoring duties to another proximate module so as to preserve its battery life.

In some examples, the first module 100 may check that the second module 100 has suitable battery resource (e.g. over a predetermined threshold), before handing off event monitoring duties to the second module 100.

The remote module 100 may be configured to carry out any combination of the methods described herein. For example, the remote module 100 may increase the frequency of transmission on detecting an event, alter the communication mode and lower frequency as the battery depletes, before finally handing off the communication to another unit as the battery reaches a critical stage.

The relevant battery values thresholds and associated actions may be stored in the memory 120. For example, each remote module 100 may store a configuration table in the memory. The configuration table may be remotely editable, for example via the server 300, so as to adjust the behaviour of the remote module 100.

It will be appreciated that the use cases discussed herein (reservoirs, urban CCTV, traffic monitoring etc) are merely exemplary, and that the remote modules and monitoring systems discussed herein may be employed in a wide range of scenarios, equipped with suitable sensors. Other example sensors include microphones, wind sensors, noise sensors, radioactivity sensors, water flow sensors, pressure sensors, and sensors of UV light, pollen, temperature, humidity, magnetic field and the like. The system may be employed in the monitoring of crowds, for example around stadiums. The system may be employed in the monitoring of public transport and public transport hubs. The system may be employed to monitor and enforce social distancing measures in public spaces such as retail outlets.

The above-described modules, systems and methods advantageously provide means of conserving the battery life of monitoring modules that rely on rechargeable batteries. Transmitting data using 5G provides excellent bandwidth at the expense of relatively high power consumption. By reducing transmission frequency unless an event occurs, reverting to less power hungry communication methods, and providing the ability to hand off monitoring, battery life may be preserved whilst still providing the ability to monitor the event.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A remote CCTV module for a wireless monitoring system, comprising:
   a communications interface configured to transmit data to a server over a wireless telecommunications network;
   a sensor interface configured to receive sensor data from a sensor;
   a CCTV camera;
   a battery; and
   a controller configured to:
      control the communications interface to transmit the sensor data over the wireless telecommunications network at a first periodicity having a first interval between consecutive transmissions;
      process the sensor data to detect an event in an environment proximate to the module, and
      in response to detecting the event, control the communications interface to transmit the sensor data over the wireless telecommunications network at a second periodicity, wherein the second periodicity comprises a second interval between consecutive transmissions, the second interval being shorter than the first interval,
      receive a notification from the server, wherein the notification includes an indication that an event has been detected by another module, and
      in response to receiving the notification from the server, transmit the sensor data over the wireless telecommunications network at a third periodicity, the third periodicity comprising a third interval between consecutive transmissions, the third interval being shorter than the first interval.

2. The remote module of claim 1, wherein the sensor comprises the CCTV camera, and the sensor data comprises image data.

3. The remote module of claim 2, wherein the controller is configured to detect an event in the image data.

4. The remote module of claim 1, wherein:
the sensor comprises one of a pollution sensor, a water-level sensor, microphone, wind sensor, noise sensor, radioactivity sensor, water flow sensor, or pressure sensor, UV light sensor, pollen sensor, temperature sensor, humidity sensor, or magnetic field sensor, and
the controller is configured to detect the event based on a value of the sensor data exceeding a first predetermined threshold, or being below a second predetermined threshold.

5. The remote module of claim 4, wherein the predetermined thresholds are remotely configurable.

6. The remote module of claim 1, wherein the communication interface is configured to transmit and/or receive data over a 5G network.

7. The remote module of claim 1, wherein the communication interface is configured to transmit and/or receive data over one or more of 4G, 3G, 2G, EDGE, High Speed Packet Access (HSPA), High Speed Downlink Packet Access (HSDPA), or GPRS.

8. The remote module of claim 1, wherein the communication interface is configured to send and/or receive SMS messages.

9. The remote module of claim 1, wherein the controller is configured to detect cessation of the event, and in response revert to transmitting data at the first frequency.

10. The remote module of claim 1, comprising a power generator to recharge the battery, wherein the power generator comprises one of a solar panel, wind turbine, or water wheel.

11. The remote module of claim 10, wherein the controller is configured to:
determine that a remaining power of the battery is less than a predetermined value, and
in response change a communication mode used by the communications interface to transmit data from a first communication mode to a second communication mode,
wherein the second communication mode consumes less power than the first communication mode.

12. The remote module of claim 11, wherein the second communication mode comprises transmitting data to another remote module to be relayed to the server.

13. The remote module of claim 10, wherein the controller is configured to determine that a remaining power of the battery is less than a predetermined value, and in response reduce the transmission frequency.

14. The remote module of claim 10, wherein the controller is configured to determine that a remaining power of the battery is less than a predetermined value, and in response hand off monitoring of the event to a second remote module.

15. A wireless monitoring system, comprising: a server, and a plurality of remote CCTV modules as defined in claim 1.

16. The remote module of claim 1, wherein the third interval is equal to the second interval.

17. A method of monitoring an event, comprising:
capturing, by a remote CCTV module, sensor data from a sensor;
transmitting, by the remote CCTV module, the sensor data over a telecommunications network at a first periodicity having a first interval between consecutive transmissions;
detecting, by the remote CCTV module, an event in an environment proximate to the module by processing the sensor data; and
in response to detecting the event, transmitting the sensor data over the network at a second periodicity, the second periodicity comprises a second interval between consecutive transmissions, the second interval being than the first interval,
receiving a notification from the server, wherein the notification includes an indication that an event has been detected by another module, and
in response to receiving the notification from the server, transmitting the sensor data over the wireless telecommunications network at a third periodicity, the third periodicity comprising a third interval between consecutive transmissions, the third interval being shorter than the first interval.

18. A tangible non-transient computer-readable storage medium having recorded thereon instructions which, when executed by a computer, cause the computer to perform the method of claim 17.

* * * * *